United States Patent Office 3,659,020
Patented Apr. 25, 1972

3,659,020
METHOD FOR REARING RUMINANTS
Douglas Cecil Maplesden, Neshanic Station, and George Scott Myers, Jr., Flemington, N.J., assignors to Ciba Corporation, Summit, N.J.
No Drawing. Filed June 18, 1968, Ser. No. 737,808
Int. Cl. A61k 27/00
U.S. Cl. 424—330                     9 Claims

ABSTRACT OF THE DISCLOSURE

The ruminant feed, feed additive or veterinary composition, comprising a compound having the formula

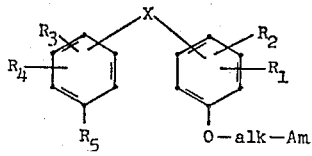

$R_{1-4}$=H, alkyl, halogeno, $CF_3$
$R_5$=H or —O—alk—Am
X=direct bond, S, SO, $SO_2$ or alkylidene
alk=lower alkylene
Am=di-lower alkylamino, lower alkyleneimino, morpholino or 4-lower alkyl-piperazino.

or an acid addition salt thereof, and an ingestible carrier material, increases the propionic-acetic acid ratio in the rumen.

BACKGROUND OF THE INVENTION

It is known that "ruminal fermentation carries with it the advantages of high efficiency of utilization of poor quality fodder and the conversion of protein of low biological value to protein of a very much higher biological value. However, the price paid by the animal for these advantages in terms of energy utilization is quite high." It "is that of maintaining a microbial population in the rumen at the expense of degradation of carbohydrate to volatile fatty acids plus the energy expenditure involved in reconverting fatty acids to carbohydrate required for normal mammalian metabolism. . . . Therefore, we must assume that the bulk of the carbohydrate required" (by the ruminant) "must be resynthesized from propionic acid." (R. W. Dougherty et al., Physiology of Digestion in the Ruminant, Butterworths, 1965, page 304). Of the volatile fatty acids found in the rumen, acetic and propionic acids are those inter alia, present in the highest concentration. Since the latter plays the major role in gluconeogenesis, it is desired to artificially enhance the propionic-acetic acid ratio in the rumen, in order to increase the average growth and weight gain of ruminants, such as cattle, sheep or goats, as well as their feed conversion.

SUMMARY OF THE INVENTION

The present invention concerns and has for its object the provision of a ruminant feed, feed-additive or veterinary composition, comprising a compound having the Formula I

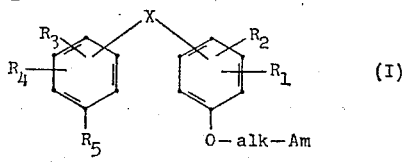

in which each of $R_1$, $R_2$, $R_3$ and $R_4$ stands for hydrogen, lower alkyl, halogen or trifluoromethyl, X for a direct bond, thio, sulfinyl, sulfonyl or lower alkylidene, preferably methylidene, 2-propylidene or 1-butylidene, $R_5$ for the radical Am—alk—O— or, in case X stands for lower alkylidene, also for hydrogen, alk for lower alkylene separating the adjacent groups by at least 2 carbon atoms, Am for di-lower alkylamino, lower alkyleneimino, morpholino or 4-lower alkyl-piperazino, or an acid addition salt thereof, together with an ingestible carrier material, as well as of a method of rearing ruminants with the use of said feed. It increases growth rate and feed efficiency, and prevents bloat.

DESCRIPTION OF THE PREFERRED EMBODIMENTS

The compounds of Formula I are described in Patent No. 3,332,958, as well as Patents Nos. 3,449,418 and 3,488,357.

Especially valuable are compounds of the Formula I, in which each of $R_1$ and $R_3$ stand for 2-methyl, each of $R_2$ and $R_4$ for 5-methyl or 5-tert. butyl, each of $R_5$ and O—alk—Am for 4-(3-dimethylaminopropoxy) and X for a direct bond, thio or 1-butylidene, as well as those of Formula I, in which each of $R_1$, $R_2$, $R_3$ and $R_5$ stand for hydrogen, $R_4$ for hydrogen or 4-chloro, O—alk—Am for 4-(2-diethylaminoethoxy) and X for 2-propylidene. They markedly enhance the propionic-acetic acid ratio of the rumen fluid of cattle and sheep fed normal diets. They furthermore reduce foam generated by a certain protozoan population present in the rumen. This can be demonstrated in in vivo or in vitro tests using withdrawing samples of fistulated animals. In the former tests, the volatile fatty acids are determined directly in the rumen fluid, whereas in the latter the active substances are added to the rumen fluid, the whole is allowed to ferment under conditions coming close to those existing in the rumen, whereupon the volatile fatty acids are determined.

It has further been observed that to achieve the effects of the invention the amount of said active substances present in the feed advantageously should range between about 0.001 to about 1.0 g./kg. of feed, preferably between about 0.01 to about 0.5 g./kg. Instead of the pure compounds, also corresponding concentrates or sludges may be used.

The ingestible carrier material used for the present ruminant feed or the additives to said feed, depends on the kind of animal to which such feed is to be given, on its age, the current market price of the material concerned and on several other factors. In general, a feed containing (besides the above-mentioned active ingredients) the usual balance of fats, carbohydrates, proteins, vitamins and minerals, is very advantageous. Suitable feed components are, for example, grain, such as rye, wheat, barley, oat or corn and mill products thereof, such as grain groats, meal or bran; roughages, such as grass, clover, milo, alfalfa, green oat or corn, which may be in the form of pasture, hay or silage; molasses or beet pulp, soybean or cotton seed meal, limestone meal, urea, mineralized salt and the like. Alternatively, the active ingredients may be administered in the form of a solution or dispersion with potable water or skimmed milk, if desired in the presence of a suitable dispersing agent, as additive or veterinary compositions, for example mixed with sugar and/or medicinal carbon, in the form of micropills or the like.

Apart from the aforementioned active substances, the feed and feedstuff additives according to the invention may contain further valuable substances, for example, antibiotics having a wide activity spectrum, such as tetracycline, nonactin, oleandomycin or longisporine; hormones or other compounds having hormone action, such as diethyl-stilbestrol or hexestrol; enzymes; antiparasitic agents; substances useful in the breeding of ruminants; as well as preservants, such as benzoic acid. Such substances are well known in the art and their use is well documented in numerous scientific papers.

The growth-promoting compounds of this application are administered orally by combining the specified quantities with a complete feed or feed supplement for ruminants. If desired, these compounds can be incorporated in other nutrient materials fed to ruminants, in the water or any ingestible, nontoxic, inert carrier material.

The following examples illustrate the invention and are not to be construed as being limitations thereon.

EXAMPLE 1

Beef ration containing 0.001% of the active ingredient

| Formula: | Kg. |
|---|---|
| Bis-[4 - (3 - dimethylamino-propoxy)-2-methyl-5-tert. butyl-phenyl]-sulfide dihydrochloride | 0.001 |
| Alfalfa hay | 20.0 |
| Oat hay | 10.0 |
| Barley | 25.0 |
| Milo | 25.0 |
| Beet pulp | 10.0 |
| Cottonseed meal | 8.0 |
| Molasses | 2.0 |

Procedure: The feed ingredients, except 1.0 kg. of barley, are thoroughly mixed in a horizontal mixer. The dihydrochloride is premixed with 1.0 kg. of finely ground barley and added to the main batch and the whole is further mixed until all ingredients are equally distributed in the feed.

EXAMPLE 2

Sheep ration containing 0.05% of the active ingredient

| Formula: | Kg. |
|---|---|
| 2-[4-(2-diethylamino-ethoxy)-phenyl] - 2 - (4-chloro-phenyl)-propane hydrochloride | 0.1 |
| Ground grass-legume hay | 50.0 |
| Cracked yellow corn | 134.3 |
| Soybean meal (44% protein) | 10.0 |
| Cane molasses | 2.0 |
| Limestone meal | 1.5 |
| Trace mineralized salt | 2.0 |

Procedure: The hydrochloride is premixed with 1.0 kg. of the soybean meal which is then mixed thoroughly with the remainder of the ration.

EXAMPLE 3

In the manner described in the previous examples the following active compounds are employed:

(a) 1,1-bis-[4-(3-dimethylamino-propoxy)-2-methyl-5-tert. butyl-phenyl]-n-butane dihydrochloride,
(b) bis-[4-(3-dimethylamino-propoxy)-2,5-dimethylphenyl]-sulfide dihydrochloride,
(c) 4,4'-di-(3-dimethylamino-propoxy)-2,2'-dimethyl-5,5'-di-tert. butyl-biphenyl dihydrochloride and
(d) 2-phenyl-2-[4-(2-diethylamino-ethoxy)-phenyl]-propane hydrochloride

EXAMPLE 4

The active ingredients mentioned above can be prepared according to the procedures disclosed in the patent and applications mentioned in the beginning, e.g. as follows:

(A) To the solution of 12.33 g. 2-(4-chlorophenyl)-2-(4-hydroxyphenyl)-propane in a mixture of 75 ml. dimethylformamide and 40 ml. toluene is added in portions 2.4 g. of a 53% suspension of sodium hydride in mineral oil while stirring and cooling. After the hydrogen evolution ceases, a solution of 7.0 g. 2-diethylaminoethyl chloride in 35 ml. toluene is added dropwise while stirring and cooling. Stirring is continued for an additional three hours at room temperature, and the reaction mixture is then allowed to stand at that temperature for fifteen hours.

The inorganic precipitate is filtered off, the filtrate is concentrated to a volume of about 50 to 80 ml., diluted with water and extracted with 300 ml. diethyl ether. The extract is separated and washed with 100 ml. of 2 N aqueous hydrochloric acid; the acid solution is separated, and after a few minutes, the 2-(4-chlorophenyl)-2-[4-(2-diethylaminoethoxy)-phenyl]-propane hydrochloride of the formula

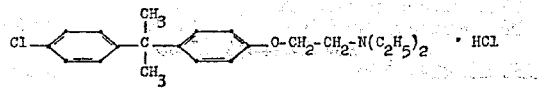

precipitates; it is collected and recrystallized from a mixture of ethanol and diethyl ether, M.P. 185–186°; yield: 18.7 g.

The starting material used is prepared as follows: To the ice-cooled Grignard reagent, prepared from 284.0 g. methyl iodide and 48.6 g. magnesium turnings in 550 ml. diethyl ether, is added dropwise a solution of 154.6 g. 4-chloro-acetophenone in 200 ml. diethyl ether while stirring. The reaction mixture is allowed to stand at room temperature and is then heated to reflux for two hours. The Grignard complex is decomposed by slowly adding 300 ml. of a saturated aqueous solution of ammonium chloride and 300 ml. water while stirring and cooling in an ice bath, 300 ml. diethyl ether are added and the organic layer is separated, washed and dried over sodium sulfate. The solvent is removed, and the 2-(4-chlorophenyl)-2-propanol is obtained by distilling the residue, B.P. 92–96°/3 mm. Hg.

The mixture of 17.1 g. thereof and 9.4 g. phenol is added portionwise to the mixture of 28.2 g. phenol and 6.7 g. aluminum chloride while stirring and cooling with water. The reaction mixture is stirred at room temperature for two hours, allowed to stand for fifteen hours and is then heated for one hour to 40–50° while stirring. It is added to 100 ml. of 6 N aqueous hydrochloric acid while stirring; the organic layer is separated and the excess phenol is removed by distillation at temperatures up to 130°/13 mm. Hg. The oily residue is distilled to yield the 2 - (4 - chlorophenyl)-2-(4-hydroxyphenyl)-propane, which crystallizes from hexane, M.P. 72–74°.

(B) To a solution of 9.6 g. 1,1-di(4-hydroxy-2-methyl-5-tert. butyl-phenyl)-n-butane in 25 ml. dimethyl formamide and 45 ml. toluene, 2.25 g. of a 53% suspension of sodium hydride in mineral oil are added gradually with stirring in an atmosphere of nitrogen. After stirring for one hour at room temperature a solution of 6.7 g. 3-dimethylamino-propyl chloride in 55 ml. toluene is added and the reaction mixture is kept at 70–80° for 8 hours. After cooling, it is filtered and concentrated in vacuo. The residue is dissolved in diethyl ether, the solution washed with water, dried and concentrated. The concentrate is dissolved in ethyl acetate and a solution of hydrogen chloride in ethyl acetate is added. The precipitate formed is filtered off and recrystallized from isopropanol-ethyl-acetate. There is obtained the 1,1-di-[4-(3-dimethylamino-propoxy) - 2 - methyl - 5 - tert. butylphenyl]-n-butane dihydrochloride of the formula

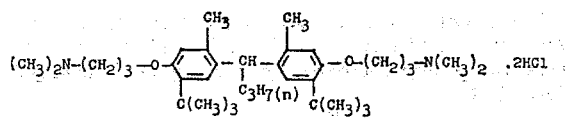

melting at 249–251°.

We claim:
1. A method for increasing growth rate, feed efficiency and for preventing bloat in ruminants by increasing the propionic-acetic acid ratio in the rumen which comprises orally administering to said ruminant, a feed composition, comprising between about 0.001 to about 1.0 gram of a compound having the formula

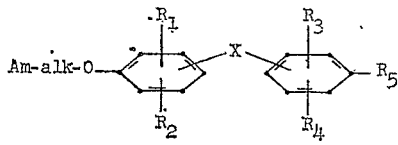

in which Am stands for di-lower alkylamino, lower alkyleneimino, morpholino or 4-lower alkyl-piperazino, alk for lower alkylene separating the adjacent groups by at least 2 carbon atoms, each of $R_1$, $R_2$, $R_3$ and $R_4$ for hydrogen, lower alkyl, halogen or trifluoromethyl, X for a direct bond, thio, sulfinyl, sulfonyl or lower alkylidene and $R_5$ for the radical Am—alk—O— or, in case X stands for lower alkylidene, also for hydrogen, or an acid addition salt thereof per kilogram of ruminant feed.

2. The method as claimed in claim 1, in which formula of the active ingredient each of $R_1$ and $R_3$ stand for 2-methyl (each of $R_2$ and $R_4$ for 5-methyl or 5-tert. butyl, propoxy) and X for a direct bond, thio or 1-butylidene.

3. The method as claimed in claim 1, in which formula of the active ingredient each of $R_1$, $R_2$, $R_3$ and $R_5$ stand for hydrogen, $R_4$ for hydrogen or 4-chloro, O—alk—Am for 4-(2-diethylaminoethoxy) and X for 2-propylidene.

4. The method as claimed in claim 1, wherein the active ingredient is the bis[4 - (3 - dimethylamino-propoxy)-2-methyl-5-tert. butyl-phenyl]-sulfide or its dihydrochloride.

5. The method as claimed in claim 1, wherein the active ingredient is the 2 - [4 - (2-diethylamino-ethoxy)-phenyl]-2-(4-chloro-phenyl)-propane or its hydrochloride.

6. The method as claimed in claim 1, wherein the active ingredient is the 1,1-bis-[4-(3-dimethylamino-propoxy)-2-methyl - 5 - tert. butyl-phenyl]-n-butane or its dihydrochloride.

7. The method as claimed in claim 1, wherein the active ingredient is the bis-[4-(3-dimethylamino-propoxy)-2,5-dimethylphenyl]-sulfide or its dihydrochloride.

8. The method as claimed in claim 1, wherein the active ingredient is the 4,4'-di-(3-dimethylamino-propoxy)-2,2'-dimethyl-5,5'-di-tert. butyl-biphenyl or its dihydrochloride.

9. The method as claimed in claim 1, wherein the active ingredient is the 2 - phenyl - 2-[4-(2-diethylaminoethoxy)-phenyl]-propane or its hydrochloride.

References Cited
UNITED STATES PATENTS

| | | | |
|---|---|---|---|
| 3,488,357 | 1/1970 | Bencze | 260—294.7 |
| 3,332,958 | 7/1967 | Werner | 260—295 |
| 3,449,418 | 6/1969 | Werner | 260—559 |

SAM ROSEN, Primary Examiner

U.S. Cl. X.R.

424—248, 250

PO-1050
(5/69)

UNITED STATES PATENT OFFICE
CERTIFICATE OF CORRECTION

Patent No. 3,659,020  Dated April 25, 1972

Inventor(s) DOUGLAS CECIL MAPLESDEN ET AL

It is certified that error appears in the above-identified patent and that said Letters Patent are hereby corrected as shown below:

Column 1, lines 4 and 5, delete "Ciba Corporation, Summit, N.J." and substitute -- CIBA-GEIGY Corporation, Ardsley, New York ---;

Column 5, line 20, delete "(" and insert --- , ---;
before line 21, insert --- each of $R_5$ and O-alk-Am for 4-(3-dimethylamino- ---;
line 27, after "bis" insert --- - ---.

Signed and sealed this 11th day of June 1974.

(SEAL)
Attest:

EDWARD M. FLETCHER, JR.
Attesting Officer

C. MARSHALL DANN
Commissioner of Patents df